Patented Nov. 24, 1931

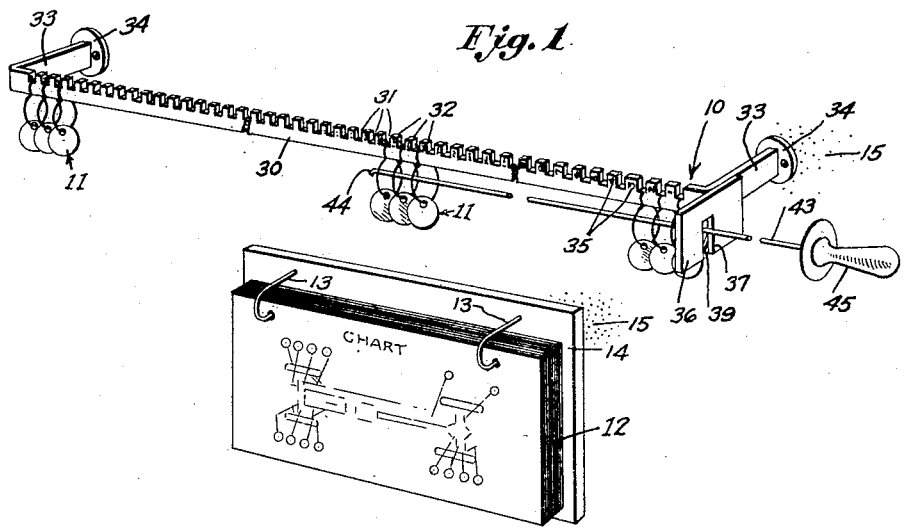
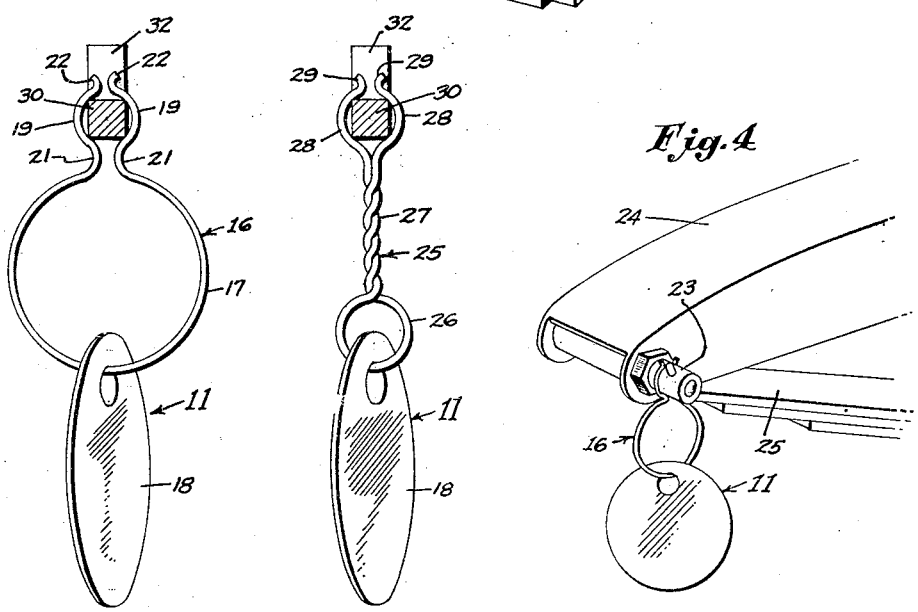

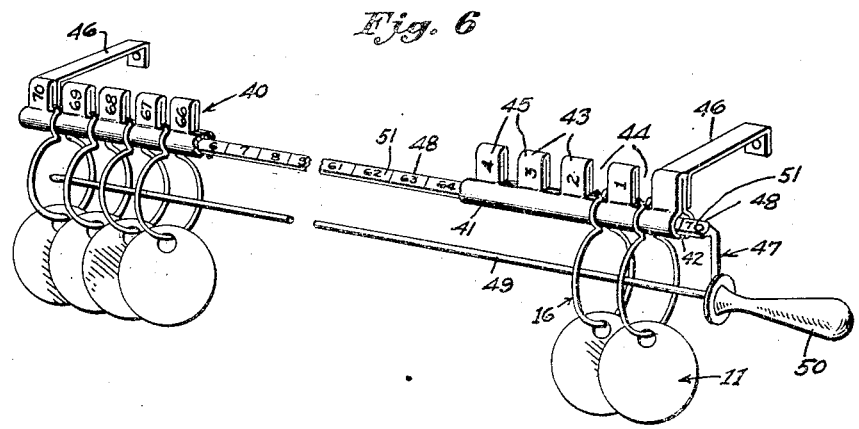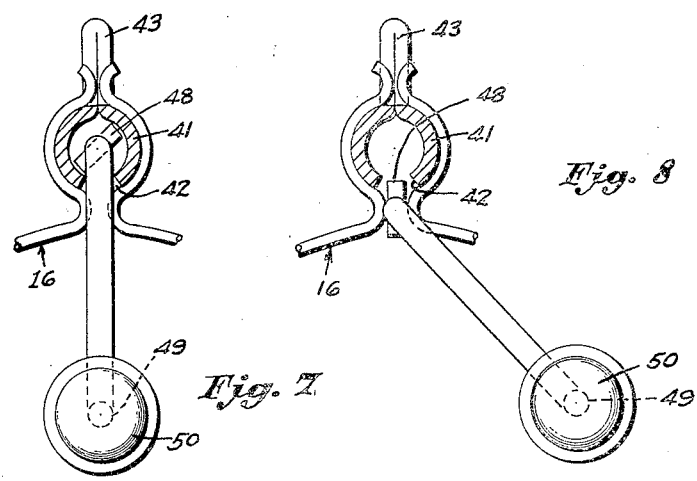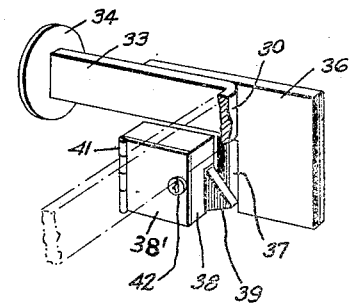

1,833,513

UNITED STATES PATENT OFFICE

BARTON A. BEAN, JR., OF WILLIAMSVILLE, AND ARTHUR G. MADDIGAN, OF BUFFALO, NEW YORK

APPARATUS AND METHOD OF LUBRICATING VEHICLES

Application filed August 27, 1930. Serial No. 478,245.

This invention relates to a system of and apparatus for facilitating and ensuring proper lubrication of the working parts of motor vehicles. More particularly it concerns such checking of greasing jobs conducted at greasing stations, garages, gasoline filling stations, and other places regularly carrying on the business of greasing automobiles.

Motor vehicles require greasing at numerous points about the chassis and motors thereof at intervals of time which vary somewhat according to the particular make of car and driving conditions but which generally occur, at present, at times when the cars have been driven distances varying between five hundred and one thousand miles. When a car has been driven such distance subsequent to lubrication, it is essential that all the wearing parts, such as spring shackles, steering mechanism, clutch pedal bearings, and fan bearings, be given a new supply of lubricant if undue wear of these is to be eliminated. Automobile greasing stations and kindred places where the owner or driver of a vehicle usually leaves his car for such service are equipped with greasing racks and high pressure grease pumps so that large numbers of cars may be, and are, expeditiously handled. As the income of such station is largely dependent upon the number of cars handled there is a tendency on the part of the station attendants to service each car as quickly as possible. Because of this, and also because individual makes and models of cars have different numbers and differently disposed points of greasing making it difficult for the attendants to find all such points, they are apt to and do overlook certain places on the chassis which should be greased. Even though the attendant be thoroughly conscientious about his task he may, through inadvertence, unfamiliarity with the particular car, or because of a psychological reaction due to having lubricated several other cars immediately before starting work on the car at hand, believe that he has attended to all the required parts of the vehicle when in reality he has not, with the result that the neglected parts may wear unduly in subsequent operation with harmful and costly results.

It has been proposed to overcome this unsatisfactory condition by providing attendants with charts containing diagrams, of substantially all makes and models of motor vehicles, which indicate the various points about the chassis thereof which should be greased. Such charts do enable the attendant to ascertain which parts of the car require his attention but they do not in any way insure against his inadvertently, or for a psychological reason, overlooking certain of these parts after he has ascertained their positions. The present invention comprehends means whereby the attendant is reminded of each individual lubrication point and to means whereby he may check the greasing operation, thus assuring to himself and the car owner or driver that a thorough and complete service has been rendered.

These means include charts such as those above referred to which contain information as to the number of greasing points on the particular car to be serviced and signal tags, adapted to be fitted to the required lubrication points, and means for dispensing the number of such tags that are required, which number is indicated by the chart means. Upon receiving any particular model and make of car to be serviced, the attendant may consult the chart, appertaining to the car, and be apprised of the number of lubrication points thereon. He may then secure this certain number of tags from the dispensing apparatus and affix them to the proper points on the car, referring, if necessary, to the chart to determine the positions of these points. Means are provided on the signals which adapt them to be suspended from conventional grease fittings, and when all the signals have been applied, the attendant is assured that all greasing points have been tagged or marked, since the number of signal tags dispensed is exactly equal to the number of places to be greased. The attendant may now proceed with the actual greasing, removing each signal as the fitting or lubrication point is serviced, the tags, being conspicuous in color and design, constantly giving notice of the points which have not yet been lubricated.

These and other objects of my invention will become apparent from a perusal of the following detailed description of a typical system and apparatus, the latter being illustrated in the accompanying drawings wherein:—

Fig. 1 is a perspective view showing one form of dispensing apparatus with the tags appended and the charts suspended in an accessible position adjacent thereto;

Fig. 2 is an enlarged section taken transversely through the apparatus shown in Fig. 1 and depicting in elevation an appended tag;

Fig. 3 is a view similar to Fig. 2 showing a modified form of tag;

Fig. 4 is a perspective view of a fragmentary portion of a motor vehicle, equipped with a grease fitting, to which a signal is attached;

Fig. 5 is a detailed perspective view of one end of the apparatus illustrated in Fig. 1, and showing means associated therewith for counting or checking the number of times the dispensing device has been actuated to dispense signal tags;

Fig. 6 is a perspective similar to Fig. 1, showing a modified dispensing mechanism and the associated tags; and Figs. 7 and 8 are enlarged vertical, transverse sectional views taken through the mechanism of Fig. 6 and depicting the latter in different phases of actuation.

As shown in Fig. 1, the apparatus comprises a dispensing mechanism 10, a plurality of tags 11, and a number of charts 12 each containing diagrams and other indicia relating to the number and locations or positions of the greasing points or fittings on the particular car to which it relates, there being one chart 12 for each current make and model of automotive vehicle. The charts are preferably suspended to wire loops 13 attached to a backing board 14 which may be mounted to the wall 15 or other suitable support adjacent to the mechanism 10, in such a manner that any one of the various charts may be quickly and conveniently consulted. The tags or signals 11 may each comprise as shown in Fig. 2, a spring metal wire clip 16 having a relatively large loop 17 extending through an apertured signal plate 18, which may be of a bright color so as to be readily conspicuous. The apertures are of such size that substantially universal movement is afforded between the signal member 18 and the clip 16 so that the signal tag may be attached to any grease fitting on any chassis. The upper ends 19 of the clip 16 are formed to provide opposed substantially semi-circular clamping portions, the ends being held substantially closed at their ends 19, and neck portions 21, or portions between the ends 19 and loops 17 by the spring tension of the latter portions. The tips of the clamp portions 19 are bent divergingly outward at 22 so that the portions 19 may be spread apart by the camming action of the tips upon pushing the clips into engagement with objects having approximately equal diameters. In Fig. 4 a tag 16 is shown as attached to a conventional grease fitting 23, which is threaded into a shackle bolt which connects the automobile frame and spring members designated at 24 and 25 respectively, the resilience of the clip being such as to permit it to be pressed upon or pulled from the fitting 23 with slight pressure.

The modified clip 25 shown in Fig. 3 comprises a loop 26 for engaging the plate 18, a twisted shank 27 of any desired length, and clamping end portions 28 with diverging tips 29. The twisted shank 27 provides rigidity and a good gripping surface on the clip 25 enabling it to be readily attached to fittings, similar to that shown at 23, which are located in relatively inaccessible positions about the chassis. The clips 16 and 25, being formed of light spring wire, will not interfere with the attachment of grease guns or other devices to the grease fitting.

The tags when not in use are mounted upon the dispensing mechanism 10 which, in the form shown, includes a bar 30, having notches 31, corresponding or exceeding in number the maximum number of greasing points designated on any one of the charts 12, the notches being spaced by upwardly extending lugs 32. The bar 30 is affixed to the wall 15, or other suitable support by means of rearwardly extending arms 33 provided with attaching flanges 34. One tag 11 is fitted over the bar at the point of each recess or notch 31, by pressing the clip portion thereof upwardly into clamping engagement with the bar, as shown in Figs. 1, 2 and 3, so that a number of tags corresponding to the number of notches 31 will be held in laterally spaced relation by the lugs 32. These lugs may have numerals 35, reading from right to left of Fig. 1 as 1, 2, 3, 4 and so on, the numerals indicating the number of tags suspended to the right thereof.

An enlarged plate 36 having a vertically extending recess 37 is secured to the end of the bar 30 having the lug 32 of lowest numerical value, which is the right end as viewed in Fig. 1, and a counting mechanism 38, of conventional construction and provided with a retractable latch or locking bar 39, is secured to the plate 36 as shown in Fig. 5. The outer end of the latch bar 39 has a beveled cam surface so that downward movement of any object in engagement with the bar will produce an inward movement of the bar which will in turn effect the registry of each such movement in the counting unit 38. The latter may be provided with a cover 38', hinged at 41 and provided with a lock 42, so that the counter may be opened to read the total contained therein only by an authorized person having a key fitting the lock.

An operating rod or foil 43 of length substantially equal to that of the bar 30, and diameter slightly smaller than the width of the recess 37 in the plate 36, is provided at one end with a hook portion 44 and at the opposite end with a handle 45. The foil may be inserted through the notch 37 and through the loops 17 of the tags 11, and may be moved downwardly to remove from the rack 30 all the tags through which it extends. Since the retractable latch 39 normally extends substantially across the notch 37, it must be moved inwardly to actuate the counter 38 upon each downward movement of the foil 43. It will be understood that the foil may be actuated to remove any required number of tags from the rack by moving the hooked end 44 thereof to a position beneath the lug 32 bearing the numeral designating such required number, and by then pressing the foil downwardly, releasing and collecting on the foil all the tags to the right of the particular lug 32. Since the plate 36 is of sufficient size to preclude insertion of the foil through the loops 17 of the tags, without passing it through the recess 37, each tag releasing movement of the foil must of necessity be registered by the counting mechanism 38.

In Figs. 6, 7 and 8 is shown a modified dispensing mechanism having an elongated metal rack 40 comprising a one piece member having a lower tubular portion 41 provided with a lower longitudinal slot 42 and upwardly extending lugs 43 defining spaced notches 44, the lugs bearing numerals 45 indicative of the number of notches to the right thereof. The rack is designed to suspend tags 11, as shown, which are clipped over the tubular portion 41 adjacent to the notches, being spaced by the lugs 43, and the rack is supported at each end by a suitable bracket 46. A U-shaped foil 47, comprising an upper arm 48 of elongated cross-section, a lower arm 49 of length equal to arm 48, and a handle 50, is adapted to cooperate with the rack 40, the upper arm 48 being slidable in the hollow interior thereof and the lower arm is adapted to pass through the loops or rings 17 of the tags 11 suspended from the rack.

The arm 48 is of width slightly smaller than the inside diameter of the tubular portion 41 of the bar but greater than the width of the slot 42 while the thickness or the other cross-sectional dimension of the arm is less than the width of the slot, so that normally the arm is held against downward movement by engagement with the rack 40, as shown in Fig. 7, but may, by angular movement of the handle 50 to a position as depicted in Fig. 8, be brought into registry with the slot 42, and moved downwardly through the slot out of such engagement. In operation the U-shaped foil 47 may be adjusted longitudinally of the rack to positions in which the arm 49 passes through any desired number of tag loops 16, this number being indicated by numerals placed on a scale 51 provided on a surface of the upper arm 48 which is held in the position within the tubular rack shown in Fig. 8. The foil is then partially rotated and moved downwardly, the arm 49 carrying therewith the desired number of tags, while the remaining tags are held in place upon the rack 40.

It will be understood that the scale 51 is so arranged that when, for example, the numeral 70 appears thereon immediately adjacent to the right end of the rack, the opposite end of the foil arm 49 will be immediately below the lug bearing the number 70, and that should the foil be disengaged from the rack 70 tags would be removed. It will also be understood that if it is desired, the dispensing mechanism shown in Fig. 6 may be fitted with a counter similar to that shown in Fig. 5, to record the number of times the foil 47 is released. The indicia 35, 45 or 51 may comprise symbols or names of particular makes or models of cars employing the number of grease fittings corresponding to the number of signal tags indicated by the position of such indicia, rather than numerals if it be desired.

When a motor vehicle is brought for servicing to a greasing station employing the hereinbefore described apparatus, the chart 12 relating to the particular model and make of vehicle is consulted to determine the number of lubricating fittings, as that shown in Fig. 4 at 23, and their positions about the chassis. The dispensing apparatus is then adjusted to that number, and the required number of tags 11 are removed with the foil and taken to the vehicle, where the tags may be removed one by one from the foil and placed on the lubricating fittings about the chassis. When all the tags have been so placed, the station attendant is assured that all proper places for greasing have been located and he may proceed with the actual lubricating operation. If, however, all the places can not be found, as evinced by one or more tags remaining on the foil, the attendant may consult the chart 12 to determine where the additional tag or tags shall be positioned.

As each fitting 23 is filled with grease or oil, the tag affixed to it is removed and replaced on the foil. The tags, being preferably of bright color, will attract the attendant so that he will be able to proceed rapidly with the greasing, without losing time in hunting or searching for the fittings, and there will be little likelihood of overlooking any fitting. Further, since the tag on each fitting is removed at the time of greasing, there will be no time wasted by repetition of operation. When the tags are removed from the vehicle fittings and are replaced on the foil, they may be returned to the rack, where if desired an additional check may be had to determine if all the tags have been removed from the vehicle, thereby insuring that the lubricating job has been completed as to every fitting.

It will thus be understood, that the present invention provides a simple and positive method and apparatus for accurately checking an automobile grease job, the devices being applicable to any and all makes and models of vehicles which may be presented for servicing. It will further be understood that various changes in both method and apparatus may be made within the scope of the invention, that, for example, different persons may be employed to conduct various phases of the operation, that apparatus may be modified to check the greasing of one particular class of vehicles, and that accordingly it is intended that the invention shall be commensurate with the scope of the appended claims.

What is claimed is:—

1. Apparatus for checking a motor vehicle grease job comprising, a plurality of tags adapted to be attached to points of lubrication on a vehicle chassis, means for indicating the number of such points to be lubricated on a particular vehicle, means for releasably retaining the plurality of tags, and means for removing from the retaining means a number of the tags corresponding to the number of points indicated by the indicating means, whereby upon attachment of the removed tags to the points of lubrication all of the lubrication points will be visibly indicated.

2. Apparatus for checking lubricating operations on a vehicle, having a number of points thereon to be lubricated, comprising a plurality of tags, means on said tags for attaching the same to the points to be lubricated, support means for releasably retaining the plurality of tags, means for indicating the number of tags on said support, and means for selectively withdrawing from said support a set of tags corresponding in number to the number of points to be lubricated.

3. Apparatus for checking lubricating operations on a vehicle having a number of points to be lubricated, said apparatus comprising a holder, a plurality of tags, attaching means removably connecting said tags to said holder at spaced intervals therealong, and means associated with the holder to denote progressively the number of tags on said support, said attaching means being shaped to receive the grease fittings of such vehicle to secure the tags thereon.

4. Means for releasably attaching a signal to a vehicle lubricating fitting comprising a wire having its central portion formed in a loop, the portions adjacent said loop being twisted to provide a rigid shank, and the end portion of said wire being formed to provide resilient clamping means for attachment to the vehicle lubricating fitting.

5. Apparatus for use with signal tags having loop portions and resilient clamp portions, said apparatus comprising a rack having spaced recesses defining lugs thereon, the clamp portion of said tags engaging said rack bar adjacent to the recesses thereon, foil means removably engaging said rack and adjustable therealong for passing through the loop portions of varying numbers of said tags, whereby a predetermined number of said tags may be released from said rack by removal of said foil means.

6. Apparatus for checking a vehicle grease job, comprising signal tags having loop portions and resilient clamp portions for releasably engaging the vehicle grease fittings, a rack having indicia bearing lugs defining recesses thereon, said rack releasably receiving the clamp portions of said tags at the recessed portions thereof, foil means removably held in movable relation to said rack for engaging the loop portions of various numbers of said tags, being movable along said indicia bearing lugs, whereby said foil means may be removed to release a predetermined number of tags from said rack, said foil means cooperating with said indicia bearing lugs to indicate the number of tags to be released by said foil means, and counting means associated with said foil means to indicate the number of times said foil means is actuated to release tags from said rack.

7. Apparatus for checking a vehicle grease job, comprising signal tags having loop portions and resilient clamp portions for engaging the vehicle grease fittings, a rack having lugs defining recesses therealong, the clamp portions of said tags engaging said rack at said recesses, and foil means comprising an arm adapted to removably engage said rack for relative sliding movement therealong and another arm for passing through the loops of a varying number of said tags, said foil means having indicia thereon to indicate the number of tag loops passed by said another arm, whereby a predetermined number of tags may be released from said rack by movement of said foil means along, and removal thereof from engagement with, said rack.

8. A method of lubricating a vehicle having a predetermined number of points thereon to be lubricated, comprising affixing a plurality of members corresponding in number to said number of points upon the vehicle at said points to visibly indicate all of the points to be lubricated, lubricating each of said points, and removing said members one by one as said points are lubricated, whereupon removal of all of said members will visibly indicate that all of said points have been lubricated.

9. The method of lubricating a vehicle having a certain number of fittings which consists of predetermining the number of fittings on the particular vehicle to be greased, securing a plurality of signal tags corresponding in number to said predetermined number, attaching one of said signal tags to each of said fittings, applying lubricant to each of said fittings, and removing said signal tags after said fittings have been lubricated.

BARTON A. BEAN, Jr.
ARTHUR G. MADDIGAN.